(No Model.)

C. H. HENDERSON.
WASTE WATER PAIL.

No. 250,532. Patented Dec. 6, 1881.

WITNESSES:
Chas. Nida.
C. Sedgwick

INVENTOR:
C. H. Henderson
BY Munn &Co
ATTORNEYS.

UNITED STATES PATENT OFFICE.

CHARLES H. HENDERSON, OF PHILADELPHIA, PENNSYLVANIA.

WASTE-WATER PAIL.

SPECIFICATION forming part of Letters Patent No. 250,532, dated December 6, 1881.

Application filed November 1, 1881. (No model.)

*To all whom it may concern:*

Be it known that I, CHARLES H. HENDERSON, of the city and county of Philadelphia, Pennsylvania, have invented a new and Improved Waste-Water Pail, of which the following is a full, clear, and exact description.

The object of my invention is to avoid the splashing and dripping of water in a waste-water pail.

The invention consists in a waste-water pail provided with a convex lid resting on a series of brackets projecting from the inner surface of the pail and united by a wire, this lid being so much smaller than the pail that an annular space will be formed between the edge of the same and the inside of the pail, through which annular space the water flows and then runs down on the inside of the pail without dripping or splashing.

Reference is to be had to the accompanying drawings, forming part of this specification, in which similar letters of reference indicate corresponding parts in all the figures.

Figure 1:
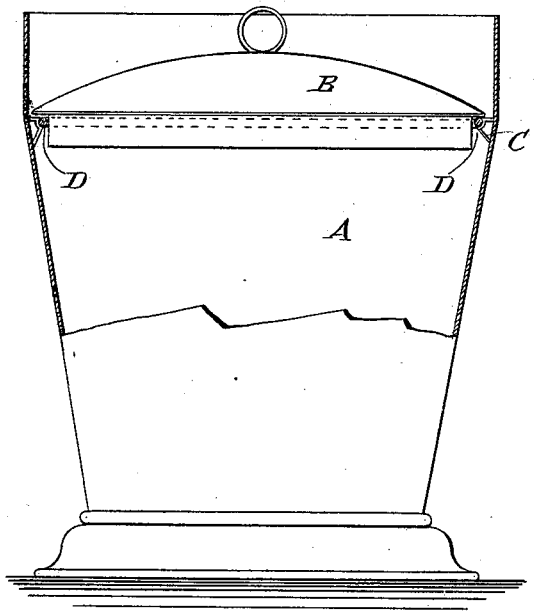
Figure 3:
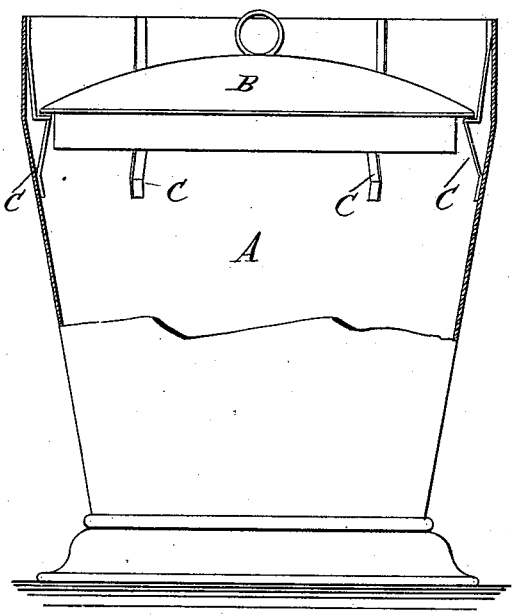
Figure 2:
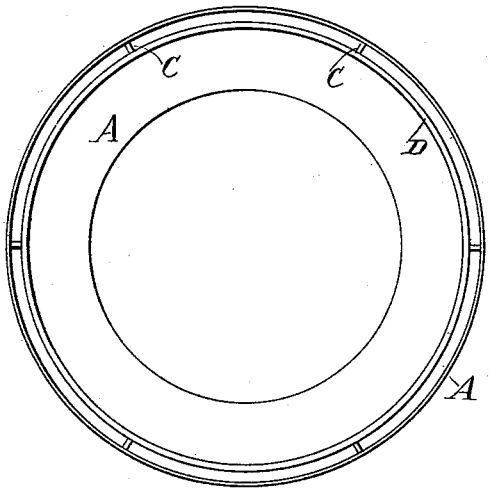

Figure 1 is a cross-sectional elevation of my improved water-pail. Fig. 2 is a plan view of the same with cover removed. Fig. 3 is a cross-sectional elevation of a modification of the same, and Fig. 4 is a plan view of this modification with cover removed.

The waste-water pail A, which may be made of wood or metal, is provided with a convex lid or cover, B, which is so much smaller than the inner diameter of the pail that an annular space about one-eighth to three-sixteenths of an inch wide will be formed between the edge of this lid and the inside of the pail A. The lid or cover B rests on a series of brackets, C, (in this case six,) projecting from the inside of the pail. These brackets may have any desired form as may be necessary. If desired, they can be connected by a circular wire, D, on which the lid also rests. The water is poured on the convex lid B, and flows down the same and through the annular space between the edge of the lid and the inside of the pail. The water then runs noiselessly down on the inner sides of the pail. All splashing, dripping of the water, &c., which are so very disagreeable, are thus avoided. The pail need not be uncovered to pour the water into it, and the cover can be cleaned very easily, as there are no recesses or corners in which rust and dirt can accumulate.

Figure 4:
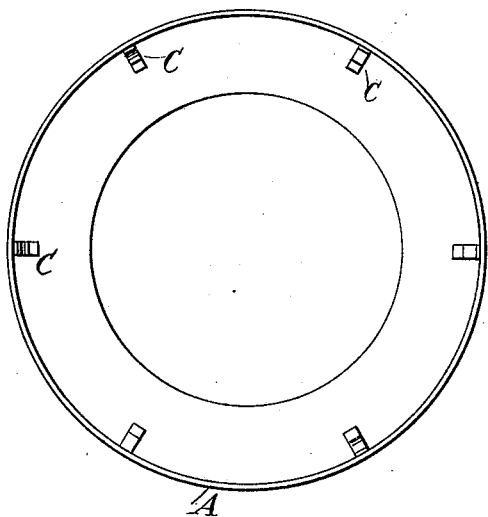

In the modification shown in Figs. 3 and 4 the brackets C are extended to the top of the pail, at which point and at their lower ends they are soldered, riveted, or otherwise secured to the pail, the wire D being dispensed with.

Having thus described my invention, I claim as new and desire to secure by Letters Patent—

1. A waste-water pail constructed substantially as herein shown and described, with internal projections for supporting the cover, as set forth.

2. The combination, with the pail A, of the internal brackets, C, and of the convex cover B, resting thereon, substantially as herein shown and described, and for the purpose set forth.

3. The combination, with the pail A, of the internal brackets, C, connected by a circular wire, D, and of the convex cover B, resting on these brackets and the wire, substantially as herein shown and described, and for the purpose set forth.

4. The combination, with a pail provided with internal projections, of a convex cover having a smaller diameter than the inside of the pail and adapted to rest on the projection of the pail, substantially as herein shown and described, and for the purpose set forth.

CHARLES HANFORD HENDERSON.

Witnesses:
MARY E. HENDERSON,
N. A. WILLIAMS.